US011410112B2

(12) United States Patent
Hou et al.

(10) Patent No.: US 11,410,112 B2
(45) Date of Patent: Aug. 9, 2022

(54) INDUSTRIAL DATA SERVICE, DATA MODELING, AND DATA APPLICATION PLATFORM

(71) Applicant: Accenture Global Solutions Limited, Dublin (IE)

(72) Inventors: Fang Hou, Beijing (CN); Yikai Wu, Beijing (CN); Xiaopei Cheng, Beijing (CN); Guo Ma, Beijing (CN); Guanyi Sun, Beijing (CN); Bin Xie, Beijing (CN); Hui Shen, Beijing (CN)

(73) Assignee: Accenture Global Solutions Limited, Dublin (IE)

(*) Notice: Subject to any disclaimer, the term of this patent is extended or adjusted under 35 U.S.C. 154(b) by 352 days.

(21) Appl. No.: 16/621,089

(22) PCT Filed: Oct. 27, 2017

(86) PCT No.: PCT/CN2017/107977
§ 371 (c)(1),
(2) Date: Dec. 10, 2019

(87) PCT Pub. No.: WO2019/080086
PCT Pub. Date: May 2, 2019

(65) Prior Publication Data
US 2020/0201293 A1 Jun. 25, 2020

(51) Int. Cl.
*G05B 13/02* (2006.01)
*G06Q 10/06* (2012.01)
(Continued)

(52) U.S. Cl.
CPC ....... *G06Q 10/067* (2013.01); *G05B 19/4183* (2013.01); *G05B 19/41875* (2013.01);
(Continued)

(58) Field of Classification Search
CPC .... G06Q 10/10; G06Q 10/06; G06Q 30/0641; G06Q 10/0635; G06Q 10/067;
(Continued)

(56) References Cited

U.S. PATENT DOCUMENTS 6,067,548 A * 5/2000 Cheng ................... G06Q 10/10
2007/0130180 A1* 6/2007 Rasmussen ............ G06F 16/25
(Continued)

FOREIGN PATENT DOCUMENTS

CN 104732310 A 6/2015
CN 105426521 A 3/2016

OTHER PUBLICATIONS

International Search Report and Written Opinion of the International Search Authority dated Jul. 31, 2018 in International Application No. PCT/CN2017/107977 (English language) (8 pp.).

*Primary Examiner* — Tuan A Vu
(74) *Attorney, Agent, or Firm* — Crowell & Moring LLP

(57) ABSTRACT

This disclosure relates to industrial data services, data modeling and applications for controlling an industrial operation. In one implementation, a platform is disclosed for allocating a data modeling request to a collaborative group of experts based on a two-dimensional data modeling flow data structure and a multilayer resource allocation graph to obtain a data model for controlling the industrial operation. The two-dimensional data modeling flow data structure and the multilayer resource allocation graph are established from an industrial graph knowledgebase using various data analytics and machine learning techniques.

17 Claims, 8 Drawing Sheets

(51) Int. Cl.
*G06N 20/00* (2019.01)
*G06F 16/901* (2019.01)
*G05B 19/418* (2006.01)
*G06N 5/02* (2006.01)
*G06F 16/25* (2019.01)
*G06Q 10/10* (2012.01)
*G06Q 30/06* (2012.01)

(52) U.S. Cl.
CPC .......... *G06F 16/25* (2019.01); *G06F 16/9024* (2019.01); *G06N 5/022* (2013.01); *G06N 5/025* (2013.01); *G06N 20/00* (2019.01); *G06Q 10/10* (2013.01); *G06Q 10/06* (2013.01); *G06Q 10/0635* (2013.01); *G06Q 30/0641* (2013.01)

(58) Field of Classification Search
CPC ................ G06F 16/25; G05B 19/4183; G05B 19/41875; G06N 20/00; G06N 5/025; G06N 5/022

See application file for complete search history.

(56) References Cited

U.S. PATENT DOCUMENTS

| | | |
|---|---|---|
| 2012/0072386 A1 | 3/2012 | Willems et al. |
| 2012/0116838 A1* | 5/2012 | Bisdikian ........... G06Q 10/0635 705/7.28 |
| 2013/0024229 A1* | 1/2013 | Agrawal ................ G06Q 10/06 705/7.14 |
| 2014/0058789 A1* | 2/2014 | Doehring ............ G06Q 10/067 705/7.27 |
| 2015/0220069 A1* | 8/2015 | Linehan ............ G06Q 30/0641 700/276 |

* cited by examiner

INDUSTRIAL DATA SERVICE, DATA MODELING, AND DATA APPLICATION PLATFORM

CROSS-REFERENCE TO RELATED APPLICATION

This application is the U.S. National Stage of International Application No. PCT/CN2017/107977, filed on Oct. 27, 2017.

TECHNICAL FIELD

This disclosure is related to an electronic platform for providing data services, data modeling, and data application development in an industrial setting.

BACKGROUND

An industrial facility, such as a chemical plant, involves complex spontaneous and non-routine data service and modeling tasks related to business, supply chain, engineering, production, sales, and other types of data. These tasks often require identification, processing, and modeling of diverse sets of industrial data. As such, these tasks involve collaboration of personnel with a diverse set of expertise in an orderly and controlled data-centric workflow. Manual data identification, task assignment, and workflow control are inefficient and inaccurate.

DETAILED DESCRIPTION

Figure 1:
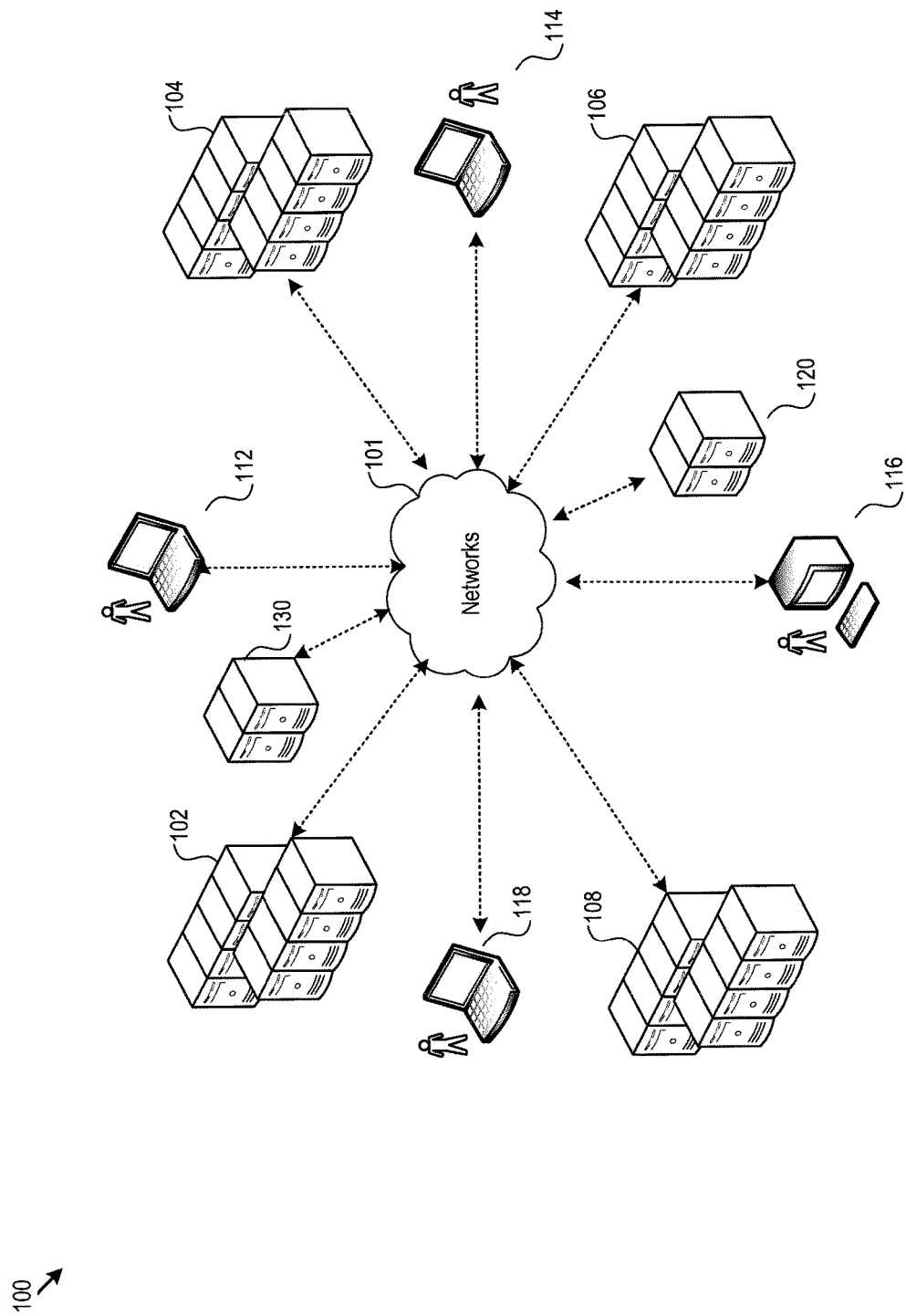
FIG. 1 shows an exemplary platform for providing industrial data service, data modeling, and data application development.

The operation of an industrial plant may involve a large number of entities having complex relationships. These entities, for example, may include physical as well as abstract items of disparate nature and characteristics, including but not limited to domain processes, facilities, equipment, sensors/sensor parameters, personnel hierarchies, supply chains, raw materials, intermediate products, final products, key performance measures, customers, power consumptions, emissions, and regulation compliances. Traditional databases, such as relational databases may not provide an efficiently way to capture these complex relationships between these disparate entities. Instead, data representing these entities and their relationships may be used to build a multi-dimensional customized graph knowledgebase for the industrial plant. One example of such an industrial graph knowledgebase is described in detail in the PCT International Patent Application No. PCT/CN2017/095619 filed with the China State Intellectual Property Office on Aug. 2, 2017 by the same applicant (which is herein incorporated by reference). Such an industrial graph knowledgebase, for example, may include a graph database for storing data items comprising various nodes (or data elements) representing industrial entities of various predetermined dimensions as well as edges representing relationships between the industrial entities within or across the dimensions. Such an industrial graph knowledgebase may further provide intermediate data repositories developed from the graph database for facilitating efficient usage and speedy access of the graph knowledgebase by external data applications. The industrial graph knowledgebase may additionally include an application program interface for applications external to the graph knowledgebase to access the data stored in the graph database and the intermediate data repositories. These applications may provide data query functions and other data services for monitoring, controlling, and optimizing the industrial plant.

The industrial plant may further generate operational data that are not suitable for storage in the graphic database. For example, while a sensor disposed in a chemical plant may be included as a data element in the graph database together with its relationships with various other data elements representing, e.g., equipment, domain processes, key production indictors, and responsible personnel, a log of a parameter it monitors during the operation of the industrial plant, e.g., a temperature, a pressure, or a flow rate, may not be suitable for storage in the graphic database. Such industrial operational data may instead be maintained in an appropriate format in another suitable database, referred herein as an industrial operational database.

The industrial operational data maintained in the industrial operational database are critical for operators of the industrial plant because they contain information that may be extracted and modeled for optimizing, predicting, and controlling the industrial operation. For example, PCT International Patent Application No. PCT/CN2016/096386 filed on Aug. 23, 2016 with the China State Intellectual Property Office by the same applicant, which is incorporated by reference herein, describes a complex data model for predicting styrene production in a petroleum refining and processing plant based on analyzing current and historical sensor and production data using various machine leaning algorithms. Data applications based on data models of this and other types may be further developed to enable effective monitoring and optimization of the operation of the industrial plant by the operators. For example, outputs of a data model may be automatically fed back to equipment in the industrial plant for controlling and achieving optimal operational parameters for, e.g., styrene production.

The development, maintenance, and refinement of each of these data models and data applications usually require a collaboration of individuals having various types of expertise from various roles in the industrial operation in a structured data modeling flow process. The data flow may follow a predefined set of general steps particularized based on the nature of each data modeling request. The individuals involved in a particular data modeling request, for example, may include but are not limited to process experts, on-site or floor engineers, and data scientists. An appropriate set of collaborating individuals for handling the particular data modeling request may be identified based on the nature of the data modeling request and information contained and extracted from the data elements and relationships stored in the graph database of the industrial graph knowledgebase. These identified individuals are assigned to the structured data flow for the development of the requested data model and may be separately or jointly responsible for identifying relevant industrial operational data, pre-processing the identified industrial operational data, determining suitable data modeling algorithms and data analysis components, establishing the data model, and developing applications based on the data model. Further, need for such data models and data applications may arise at any time. Lifecycles of these data models may vary greatly from a one-time request to a permanent installment for repeated uses. As such, it is desirable to establish an automated platform for streamlining the development of these data models and data applications. An exemplary platform, as will be disclosed in more detail below, may be capable of analyzing a data modeling request, determining a data flow, identifying individuals responsible for each step of the data flow, providing options of data modeling and analysis components, and automatically passing the data modeling request from individual to individual according to the data flow. Such a platform thus bridges various kinds of databases (including the industrial graph knowledgebase and other industrial operational databases) and individuals to provide an automated system for requesting, developing, maintaining, and optimizing data models and data applications.

While the disclosure below uses allocation of data modeling request to a collaborative group of individuals, these individuals may be generally viewed as a specific type of resources (human resource) for the industrial operation. The disclosure below thus may be viewed as a specific example of allocation of general resources. As such, the underlying principles of the implementations below may be broadly applied and implemented in allocating resources other than human resources.

FIG. 1 shows a system 100 for providing a platform for developing industrial data models and data applications for an industrial plant. System 100 includes an industrial graph knowledgebase 120 and an industrial operational database 130. System 100 further includes data platform servers 102, 104, 106, and 108 for hosting the industrial data model and application development platform (alternatively referred to as data platform). The data platform and the data platform servers may be accessed by individuals and their computing devices 112, 114, 116, and 118. The computing devices 112-118, the data platform servers 102-108, the industrial graph knowledgebase 120, and the industrial operational database 130 may be connected via public or private communication networks 101. The data platform servers 102-108, the industrial graph knowledgebase 120, and the industrial operational database 130 may be centralized or may be alternatively distributed across various geographic regions. The computing devices 112-118 may be any electronic devices capable of accessing the data platform servers 102-108, the industrial graph knowledgebase 120, and the industrial operational database 130 via the communication network 101. The access may be provided by means of webpages accessible in web browsers running on the computing devices 112-118 or may be provided alternatively via dedicated client application programs running on the computing devices 112-118.

Figure 2:
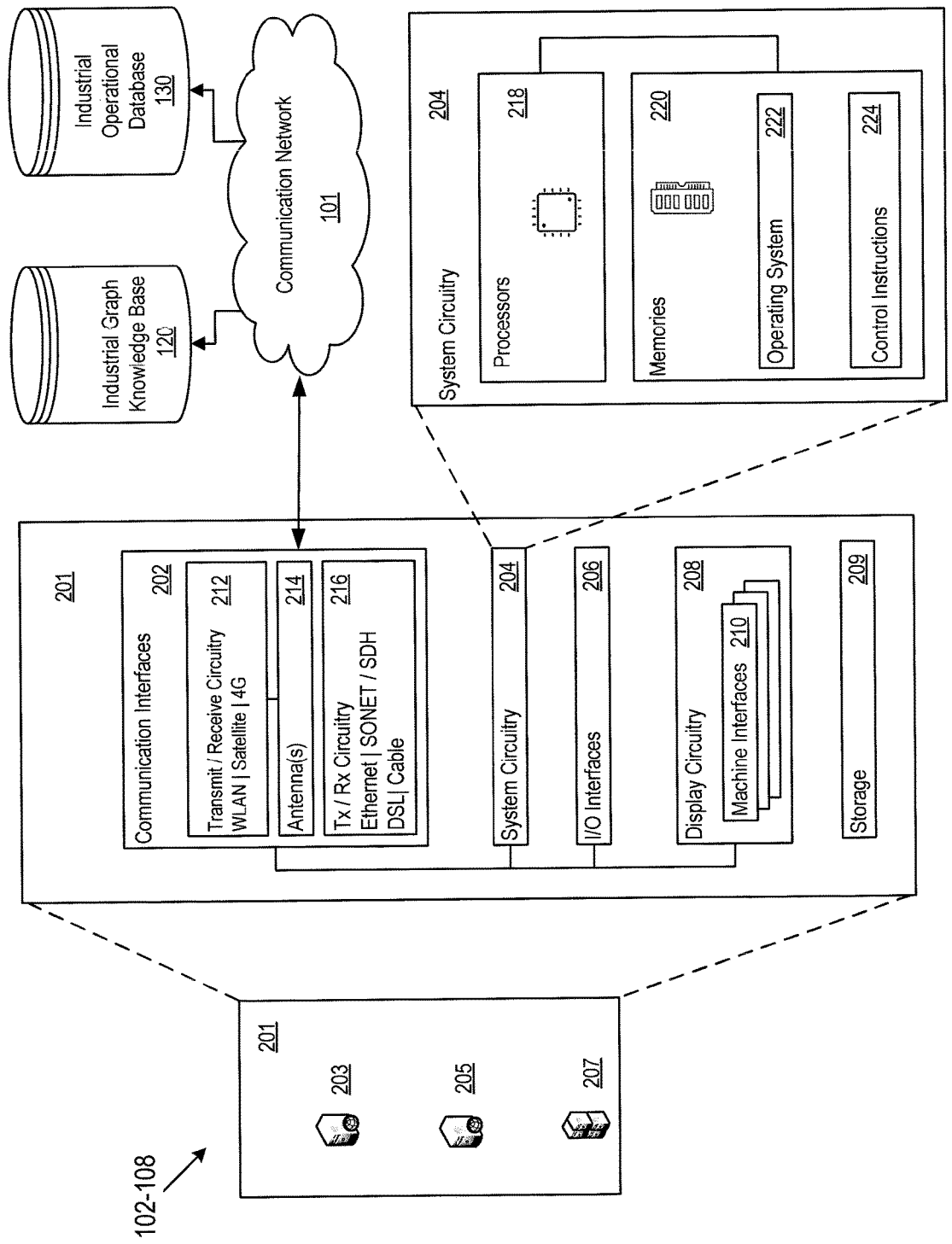
FIG. 2 shows a computing system for implementing an industrial data service, data modeling, and data application development platform.

In FIG. 2, the data platform servers 102-108 of FIG. 1 are shown as including a group of centralized or distributed computers 201, such as computers 203, 205, and 207. Computers 201 may include communication interfaces 202, system circuitry 204, input/output (I/O) interfaces 206, storage 209, and display circuitry 208 that generates machine interfaces 210 locally or for remote display, e.g., in a web browser running on a local or remote machine. The machine interfaces 210 and the I/O interfaces 206 may include GUIs, touch sensitive displays, voice or facial recognition inputs, buttons, switches, speakers and other user interface elements. Additional examples of the I/O interfaces 206 include microphones, video and still image cameras, headset and microphone input/output jacks, Universal Serial Bus (USB) connectors, memory card slots, and other types of inputs. The I/O interfaces 206 may further include magnetic or optical media interfaces (e.g., a CDROM or DVD drive), serial and parallel bus interfaces, and keyboard and mouse interfaces.

The communication interfaces 202 may include wireless transmitters and receivers ("transceivers") 212 and any antennas 214 used by the transmitting and receiving circuitry of the transceivers 212. The transceivers 212 and antennas 214 may support Wi-Fi network communications, for instance, under any version of IEEE 802.11, e.g., 802.11n or 802.11ac. The communication interfaces 202 may also include wireline transceivers 216. The wireline transceivers 216 may provide physical layer interfaces for any of a wide range of communication protocols, such as any type of Ethernet, data over cable service interface specification (DOCSIS), digital subscriber line (DSL), Synchronous Optical Network (SONET), or other protocol. The computers 201 of the data platform servers 102-108 may communicate with the industrial graph knowledgebase 120 and industrial operational database 130 via the communication interface 202 and the communication network 101.

The storage 209 may be used to store various initial, intermediate, or final data or model for developing various data models and data applications. The industrial graph knowledgebase 120 may include a graphic database for storing multi-dimensional nodes (data elements) and edges representing entities and relationships for the industrial plant. The term entities with respect to the graph database may be alternatively referred to as data entities. The storage 209 may be centralized or distributed. For example, the storage 209 may be hosted remotely by a cloud computing service provider.

The system circuitry 204 may include hardware, software, firmware, or other circuitry in any combination. The system circuitry 204 may be implemented, for example, with one or more systems on a chip (SoC), application specific integrated circuits (ASIC), microprocessors, discrete analog and digital circuits, and other circuitry. The system circuitry 204 is part of the implementation of any desired functionality related to the building and maintaining industrial data models and data applications. As just one example, the system circuitry 204 may include one or more instruction processors 218 and memories 220. The memories 220 stores, for example, control instructions 224 and an operating system 222. In one implementation, the instruction processors 218 executes the control instructions 224 and the operating system 222 to carry out any desired functionality related to the development and maintenance of various industrial data models and data applications.

Figure 3:
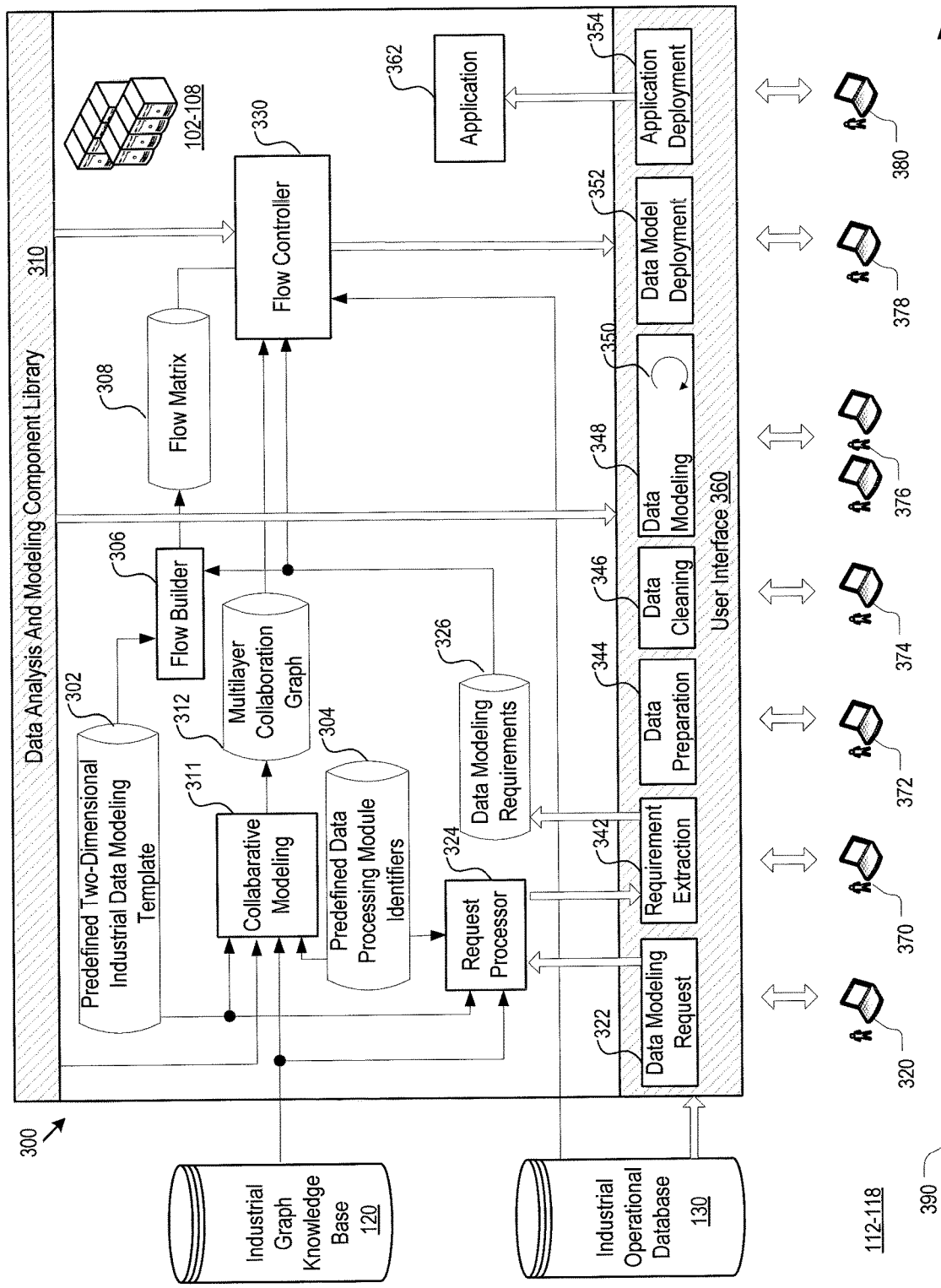
FIG. 3 illustrates an exemplary logic and data flow of a platform for providing industrial data services, data modeling, and data application development.

FIG. 3 shows an exemplary logic and data flow for a data platform 300 for developing industrial data models and data applications. The logic and data flow in the data platform 300 may be implemented by the data platform servers 102-108 of FIG. 1. The cylindrical shapes of FIG. 3 are used to represent data structures while the rectangular shapes of FIG. 3 are used to represent processing steps. The data structures represented by the cylindrical shapes, for example, may be inputs or outputs of the processing steps represented by the rectangular shapes. The data structures may be predefined or generated by the processing steps, and stored in various type of memories.

Figure 4:
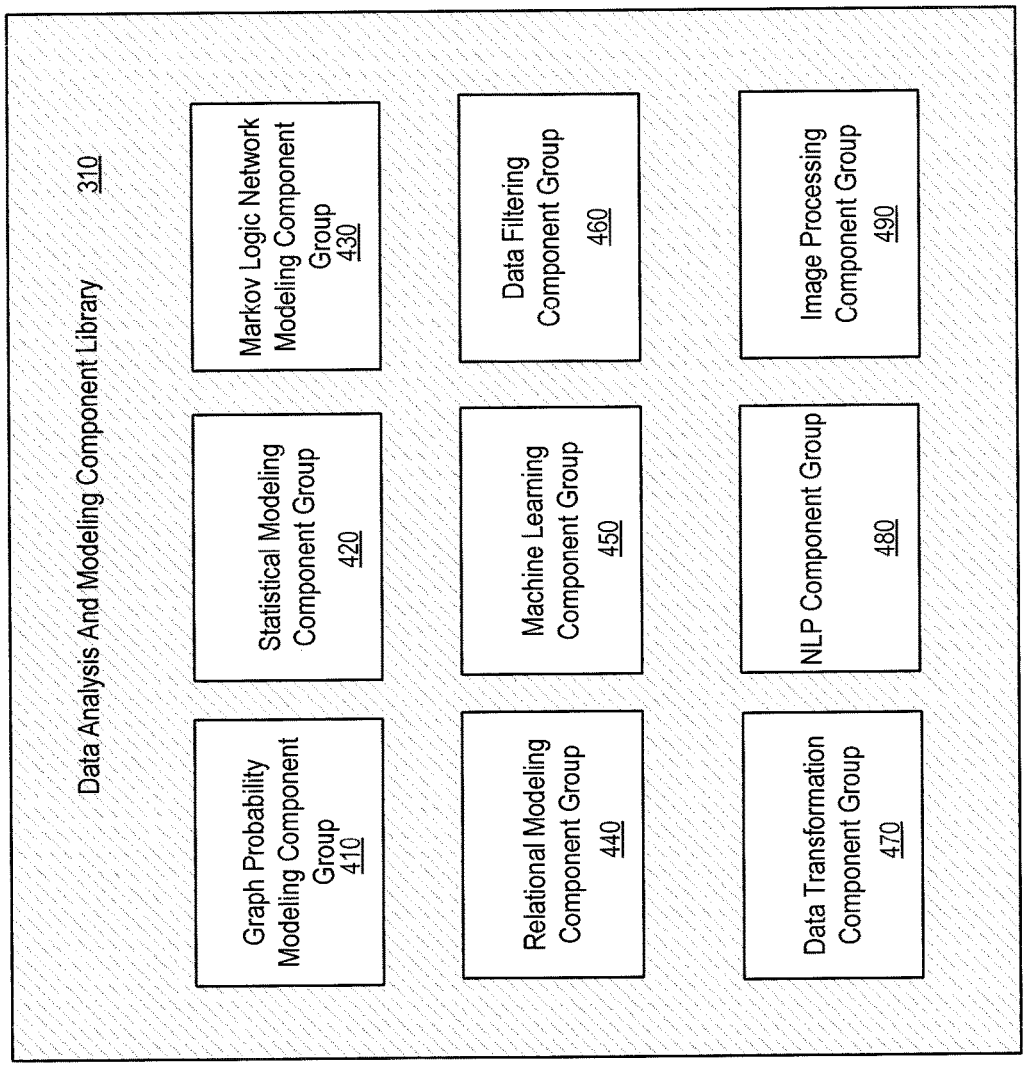
FIG. 4 illustrates an exemplary data analysis and modeling component library used in the platform of FIG. 3.

In FIG. 3, the data analysis and modeling component library 310 contains data analysis and processing tools and components needed for implementing various functions of the data platform 300. As shown in further detail in FIG. 4, these components may be provided as groups of components including but not limited to statistical modeling component group 420, machine learning component group 450, graph probability modeling component group 410, Markov logic network modeling component group 430, relational learning and modeling component group 440, data filtering component group 460, data transformation component group 470 (such as Fourier transform), natural language processing (NLP) component group 480, and image processing component group 490. The data processing components in the modeling component library 310 may be updated at any time and may be accessed by the rest of the data platform 300 via, e.g., function calls. Each component group above may further include various independent data processing components. For example, there may be multiple separate and independent machine learning algorithms provided within the machine learning component group 450. They may include dimension reduction algorithms such as principle component regression and independent component analysis. They may further include classifiers based on regression algorithms such as random forest regression, linear regression, logistic regression, and naive Bayes classifier. Some of these machine learning algorithm components may be alternatively provided as one single component having different options specified by input parameters. Some of the data processing components of the modeling component library 310 above may belong to the same type but different species of data processing components. For example, there may be multiple separate and independent data filtering components in the data filtering component group 460 that are of the same type but different species, such as various species of Kalman filters.

Returning to FIG. 3, the data platform 300 may further include a user interface 360 for providing personnel of the industrial plant 320 and 370-380 and their computing devices access to the data platform 300. The access may be permissioned, e.g., protected by user names/passwords or other security measures. The personnel of the industrial plant may include a requestor 320 who may submit a particular data modeling request to the data platform 300 via a data modeling request interface 322. In one implementation, permission may be given to a set of predefined groups of personnel of the industrial plant for submitting data modeling requests. As will be described below, a collaborative group of personnel 370-380 may be identified by the data platform 300 and participate in developing the requested data model and application associated with the data model in an orderly manner according to a process flow provisioned by the data platform 300, as shown by the arrow 390 of FIG. 3.

The user interface 360 of FIG. 3 may be provided via webpages accessible by the industrial plant personnel 320 and 370-380 via web browsers running on their computing devices. Accordingly, the data platform 300 may include web servers for hosting these web pages. Alternatively, the user interface 360 may include a server side software component of the data platform 300 and correspondingly, the computing device of the industrial plant personnel may be installed with client side software components for accessing the data platform 300 via the server side software component.

In FIG. 3, the data platform 300 further includes data structures 302 and 304 for a predefined two-dimensional industrial data modeling template (302) and a set of predefined data processing module identifiers (304) corresponding to a set of data processing modules. The predefined two-dimensional industrial data modeling template 302 may be alternatively referred to as a data modeling flow data structure. These predefined data structures may facilitate an establishment of a framework for the development of industrial data models and data applications.

In one implementation, the set of predefined data processing module identifiers 304 of FIG. 3 may include identifiers corresponding to a set of data processing modules. Each data processing module may be a processing unit for accomplishing a particular data modeling task. Each data modeling request may involve carrying out a set of data processing modules in a particular order on a set of industrial operational data. The data processing modules may include a data quality analysis module, a data importing module, a data filtering module, a classifier module, and the like. Each data processing module may be supported by one or more data processing components in the data analysis and modeling component library 310.

Figure 5:
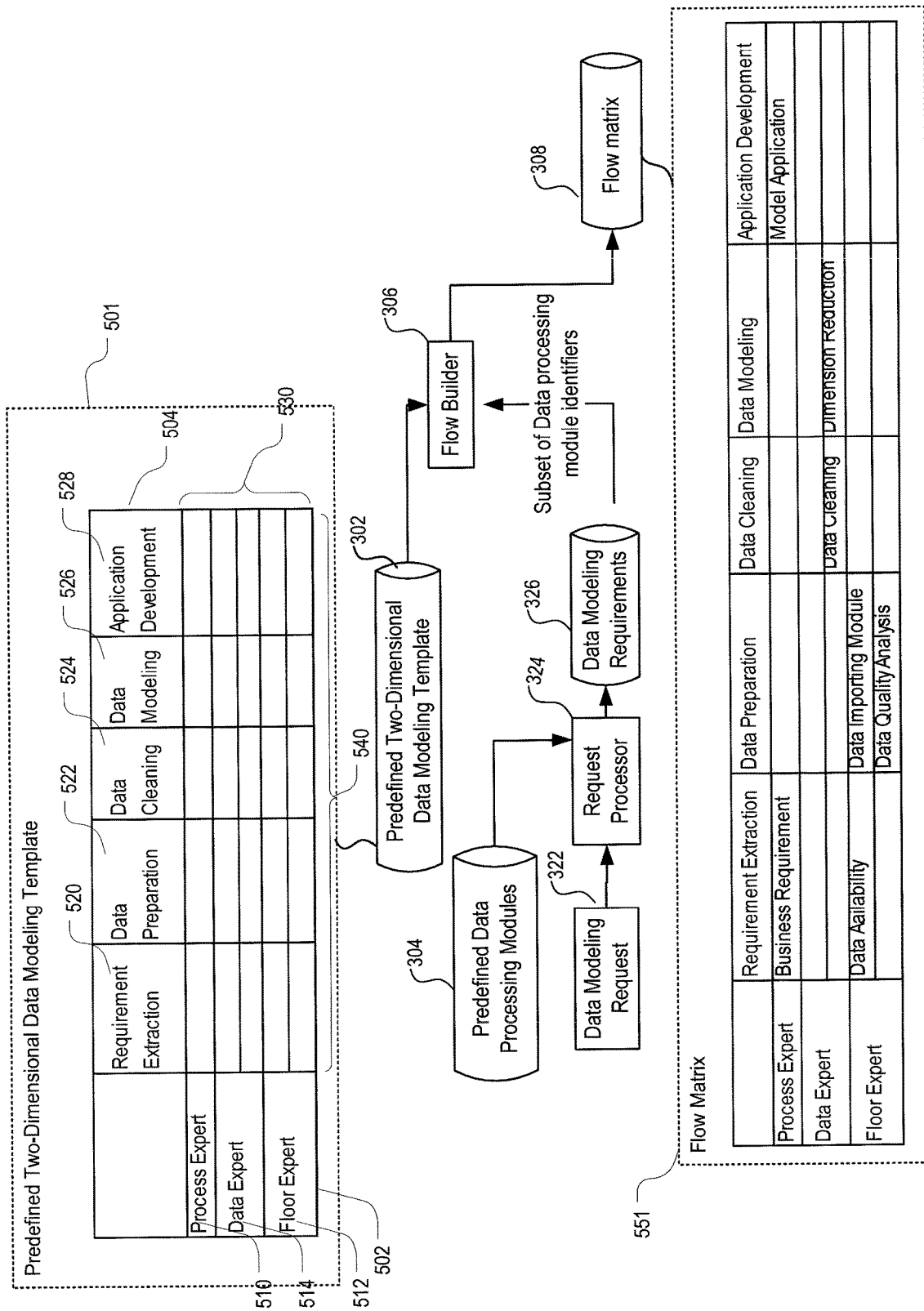
FIG. 5 illustrates an exemplary logic and data flow for generating a two-dimensional data modeling template.

The predefined two-dimensional industrial data modeling template 302 of FIG. 3 is further illustrated by an exemplary data modeling template 501 of FIG. 5. The two-dimensional industrial data modeling template 501 may logically contain multiple rows and columns. As shown by column 502, the row dimension (resource dimension) of the two-dimensional industrial data modeling template 501 represents various predefined types of roles for individuals in the development of the data models and corresponding data applications. Definition and separation of these roles may be predetermined and are based on the nature of the industrial operation and the general nature of the data modeling tasks. For example, individual roles for participating in the development of a data model and a corresponding application may be broadly categorized into three distinct types including process (or domain process) expert type 510, floor or on-site expert type 512, and data expert or scientist type 514. The process expert type 510 may include individuals that are familiar with overall operation of domain processes in the industrial plant. The floor or on-site expert type 512 may include individuals who are familiar with particular equipment, device or subdomain of a domain process. The data expert type 514 may include individuals familiar with data modeling tools and algorithms such as mathematicians and statisticians.

The specific division of experts above is only one of many examples. FIG. 5 specifically includes data engineer or scientist type 514 because some data analysis and processing tasks needed for industrial data modeling often involve techniques that are data centric rather than industrial specific. As such, experts that are not privy to industrial domain processes but possess skills for handling data (such as mathematicians, statisticians, and the like) may be specifically identified as one of the multiple types of experts.

Continuing with FIG. 5, the column dimension (data modeling stage dimension or data modeling flow dimension) 504 of the predefined two-dimensional industrial data modeling template 501 represents various processing flow stages (or predefined data modeling stages) in developing data models and data applications. The data modeling flow dimension may be predetermined according the nature and characteristics of the industrial operation. In the example of FIG. 5, these processing flow stages may include a requirement extraction stage 520, data preparation stage 522, a data cleaning stage 524, a data modeling stage 526, and an application development stage 528. During the requirement extraction stage 520, for example, a request for data modeling may be analyzed and various data and processing requirements may be extracted from the request. During the data preparation stage 522, for example, industrial operational data relevant to the data modeling request from various industrial operational databases may be identified and loaded into the data platform. During the data cleaning stage 524, various data filtering components from the data analysis and modeling component library may be used to perform, e.g., noise reduction, dimension reduction, and the like on the loaded relevant industrial operational data. During the data modeling stage 526, data models are developed based on, e.g., various machine learning algorithms, and during the application development stage 528, applications based on the data models are developed and tested.

For each data modeling request, the empty two-dimensional industrial data modeling template 501 of FIG. 5 may be further populated with various data processing module identifiers predefined in the data structure 304 of FIG. 3 and discussed above. Each cell of the template, including rows 530 and columns 540, may be populated with one or more of the data processing module identifiers in the data structure 304. Once populated, the two-dimensional industrial data modeling template 501 represents an association between pairs of the predefined set of data modeling stages and the predefined types of experts and the set of data processing modules, and provides a blueprint for a particular data modeling development flow.

In one implementation, some of the rows 510, 512, and 514 of the two-dimensional industrial data modeling template 501 may contain two or more sub rows. In the example of FIG. 5, the data expert row 514 and floor expert row 512 each includes two sub rows, representing that multiple data processing modules may be specified at a particular processing flow stage for a particular type of role. Similarly, each of the flow stage 520-528 may contain sub columns for allowing for multiple processing sub-stages within a particular processing stage. In one implementation, data processing modules specified in rows or sub-rows for a particular stage or sub-stage may be executed in any order or in parallel. In another implementation, data processing modules specified in rows or sub-rows for a particular stage or sub-stage may be executed in a predefined order, e.g., from top row or sub-row to the bottom row or sub-row sequentially. Further in one implementation, data modules specified in the columns or sub-columns 520-526 may be executed sequentially from the left to the right of the two-dimensional industrial data modeling template 501.

Returning to FIG. 3, once the requestor 320 submits a data modeling request via the data modeling request interface 322 to the data platform 300, the request is subsequently processed by a request processor 324. The request processor 324 may send the processed request to an industrial plant personnel 370 via a requirement extraction interface 342 for extracting various requirements for the data modeling request. The extracted requirements may be maintained by the data platform 300 in a data structure for data modeling requirement 326 (alternatively referred to as data modeling requirements 326). The data modeling requirements 326, for example, may include a subset of data processing module identifiers among the collection of predefined data processing module identifiers 304 that are needed for completing the data modeling request. The data modeling requirements 326 may additionally include the data processing stages or sub-stages during which the data processing modules corresponding to the subset of data processing module identifier should be handled. The data modeling requirements 326 may further include types of expert responsible for handling the data processing modules corresponding to the subset of data processing module identifiers. As such, the request processor 324 and the requirement extraction interface 342 may need to use the predefined two-dimensional industrial data modeling template 302 in addition to the predefined data processing module identifiers 304 as inputs.

The data modeling requirements 326 may further include a set of industrial domain processes relevant to the requested data modeling task. Determination of the relevant industrial domain processes may rely on information contained in the industrial graph knowledgebase (particularly in the data elements related to domain processes and their relationships with other data elements in the graph database). As such, the input for the request processor 324 and requirement extraction interface 342 my additionally include the industrial graph knowledgebase 120.

Further in FIG. 3, the subset of data processing module identifiers among the collection of predefined data processing module identifiers 304 needed for developing the requested data model and included in the data modeling requirements 326 may be input in a flow builder 306, together with the unpopulated two-dimensional industrial data modeling template 302. The flow builder 306, as shown in FIG. 5, is responsible for populating the two-dimensional data modeling template with the subset of data processing module identifiers according to the stages/sub-stages and types of expert associated with the subset of data processing module identifiers. The output of the flow builder 306 may be a flow matrix 308. An exemplary flow matrix 308 is illustrated by 551 of FIG. 5. Only the cells of the flow matrix 551 of FIG. 5 (or 308 of FIG. 3) populated with data modeling module identifiers will be part of the processing flow in developing the requested data model and application.

Returning to FIG. 3, the data platform 300 may further be responsible for identifying a collaborative group of personnel of the industrial plant having matching expertise and availability to develop the requested data model according to the flow matrix 308. The identification process may be carried out as part of the function of a flow controller 330. The identification process may be based on the data modeling requirements 326 and a multilayer collaboration graph 312. In one implementation, the multilayer collaborative graph may be derived from the industrial graph knowledgebase 120, the predefined two-dimensional industrial data modeling template 302, and the predefined data processing module identifiers 304 via a collaborative modeling process 311 of FIG. 3.

Figure 6:
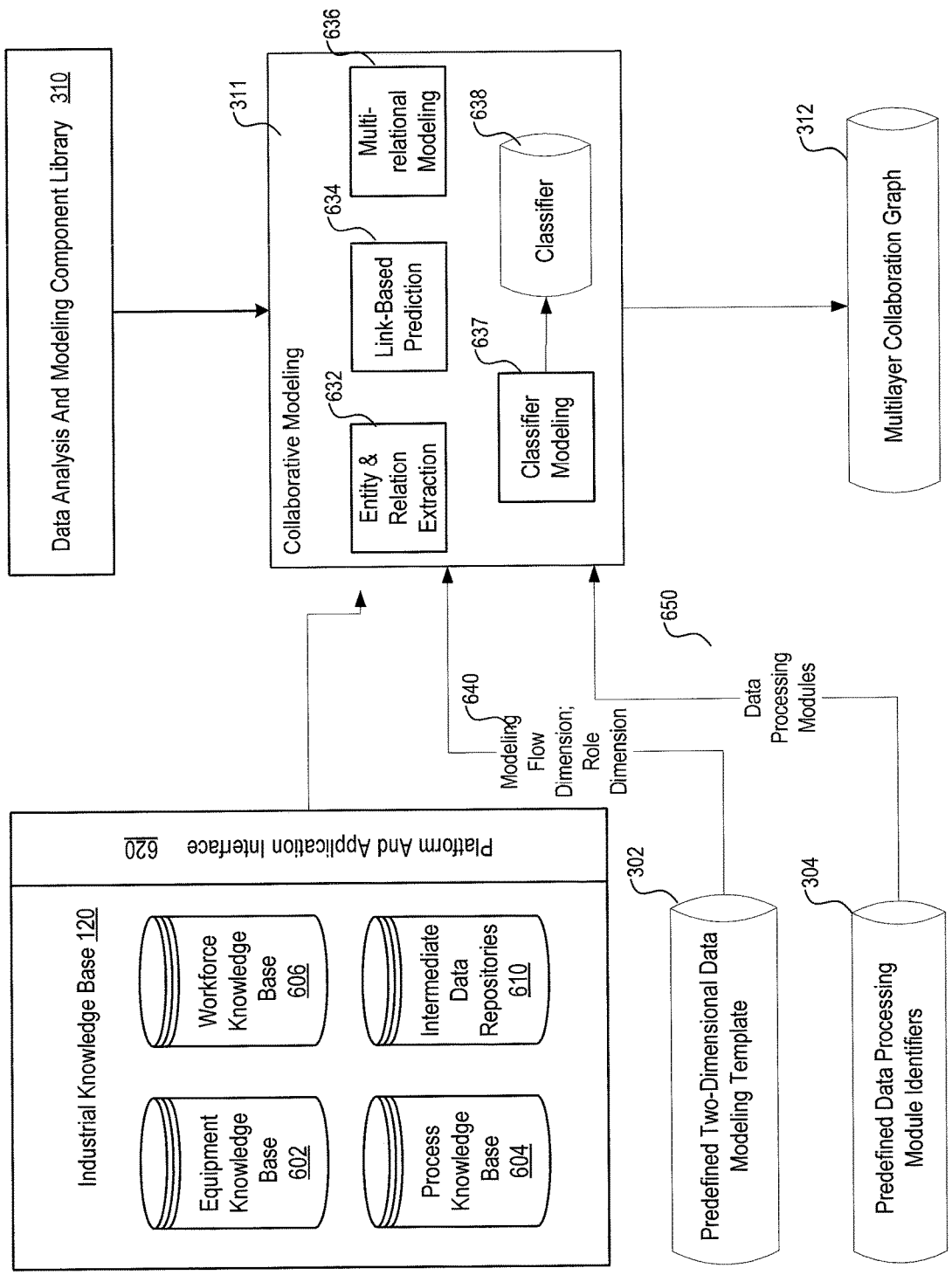
FIG. 6 illustrates an exemplary logic and data flow for generating a multilayer collaboration graph.
Figure 7:
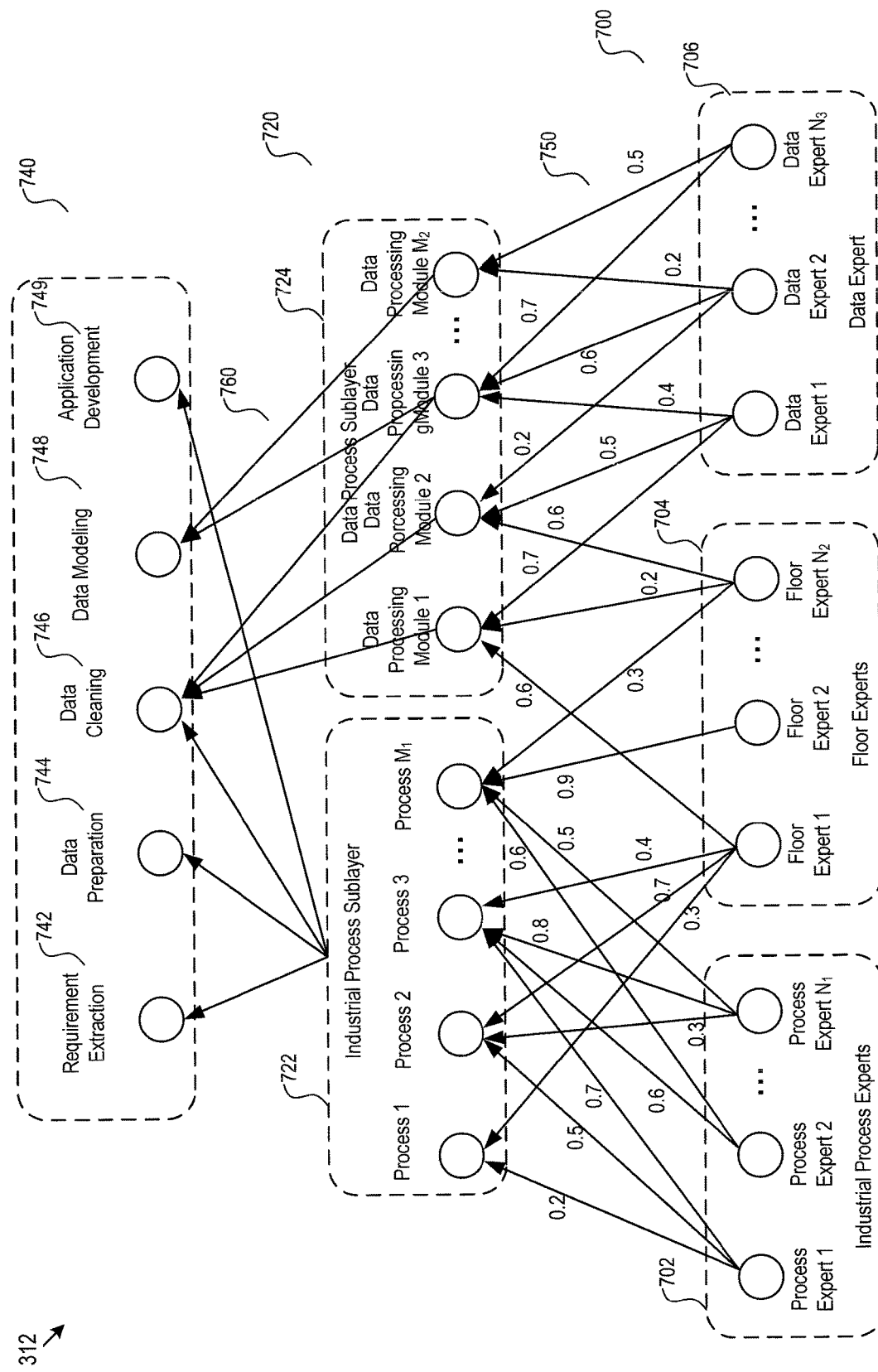
FIG. 7 shows an exemplary multilayer collaboration graph.

Details of the exemplary implementation above for deriving the multilayer collaborative graph 312 are shown in FIG. 6 and an example of the multilayer collaboration graph 312 is illustrated in FIG. 7. The multilayer collaborative graph 312 represents an example of general resource allocation graph structure applied to a scenario of human resource allocation. The multilayer collaborative graph 312 includes various nodes, alternatively referred to as graph elements. In one implementation, as shown in FIG. 7, the multilayer collaboration graph contains three layers, 700, 720, and 740. The first layer (resource layer) 700 contains graph elements of individual personnel of the industrial plant (resource graph elements or human resource graph elements). The first layer may contain role groups of graph elements 702, 704, and 706, corresponding to the multiple types of roles (or multiple types of human resources) specified in the role dimension 502 of the two-dimensional industrial data modeling template 501 in FIG. 5. Role groups 702, 704, and 706, for example, may include graph elements corresponding to process experts, floor/on-site experts, and data experts/scientists, respectively. The second layer 720 includes parallel sublayers 722 and 724. Sublayer 722 (industrial process layer) includes graph elements of various industrial domain processes. Sublayer 724 includes graph elements of data processing modules. Graph elements in the first layer 700 relate to the graph element in the second layer 720 as shown by the directional arrows 750. The third layer (data modeling stage layer) 740 includes graph elements representing flow steps in developing a data model and an application based on the data model. The graph elements in the second layer 720 relate to the graph elements in the third layer 740 according to directional arrows 760. As such, the arrows 750 and 760 represent inter-layer relationships between various graph elements of the multilayer collaborative graph 312.

As shown in FIG. 6, the industrial graph knowledgebase 120, as a main source for the collaborative modeling process 311 may contain knowledgebase of various dimensions including but not limited to equipment knowledgebase 602, workforce knowledgebase 606, and industrial process knowledgebase 604. Each of these knowledgebases may contain data elements of the respective dimensions. For example, data elements for the workforce or personnel of the industrial plant (industrial human resource data elements, or generally industrial resource data elements) and their relationships to other industrial entities either within the workforce dimension of the industrial graph knowledgebase or across the workforce dimension and other dimensions may be stored in the graph database under the workforce knowledgebase. For another example, industrial processes data elements and their relationship to other data elements may be stored in the graph database under the industrial process dimension. In some implementation, data elements for the data modeling processing modules corresponding to the predefined data processing module identifiers 304 may be stored in the graph database as a separate dimension and as such, the graph database of the industrial graph knowledgebase 120 may include relationships between these data modeling processing modules and data elements of other dimensions, such as workforce or personnel data elements. The industrial graph knowledgebase 120 may further contain intermediate data repositories 610. The intermediate data repositories 610 may contain data items that are not directly stored in the graph database. They may be data items processed and extracted from the information contained in the graph database and may be available to systems external to the knowledgebase (such as the data platform 300) via a platform and application interface 620. As such, the data items included in the intermediate data repositories 610 is immediately available and do not need to be reprocessed when requested.

Continuing with FIG. 6, the collaborative modeling process 311 interacts with the industrial graph knowledgebase 120, the predefined two-dimensional industrial data modeling template 302 and the predefined data processing module identifiers 304 to generate the multilayer collaboration graph 312 by performing various processing functions. These processing functions, for example, may include entity and relation extraction function 632, link-based prediction function 634, multi-relational modeling function 636, classifier modeling function 637 based on, e.g., various machine learning algorithms to obtain a classifier model 638, and other functions. In performing these processing functions, the collaborative modeling process 311 may utilize various components from the data analysis and modeling component library 310.

The collaborative modeling process 311, for example, may extract workforce data elements from the industrial graph knowledgebase 120, filter the workforce data elements to retain relevant individual data elements that may be enlisted to participate in developing a data model upon request. These individual data elements may be classified into the various role types of the role dimension of the two-dimensional industrial data modeling template of FIGS. 3 and 5, or the groups 702, 704 and 706 in the first layer of the multilayer collaboration graph 312 of FIG. 7.

The classification of relevant individuals into role group 702, 704, and 706 of FIG. 7 may be performed by the classifier model 638 of FIG. 6. The classifier model 638 may be developed by the classifier modeling function 637. Even though the exemplary first layer 700 of FIG. 7 contains three distinct role groups 702, 704, and 706, each individual may be classified into more than one of these role groups. As such, for the example in FIGS. 6 and 7, the classifier model 638 may pre-establish 7 rather than 3 role classes, including, process expert (702) only, floor expert (704) only, data expert (706) only, process and floor expert (702 and 704), process and data expert (702 and 706), floor and data expert (704, and 706), process, floor, and data expert (702, 704, and 706), and non-expert. Graph elements for individuals having multiple types of expertise may thus appear in multiple groups of role groups 702, 704, and 706.

The classifier modeling process 637 may be based on various machine-learning algorithms, such as random forest regression and logistic regression. A classifier based on machine learning algorithms is particularly suitable when the industrial graph knowledgebase does not contain any direct information about individual expertise relevant to data modeling, or only contain direct expertise information relevant to data modeling for a partial set of individuals. A corpus of individual data elements each labeled with one of the 7 role classifications may be established. The corpus may be established manually by labeling individual data elements in the graphic database with known expertise. Alternatively, the corpus may be established automatically by traverse the graphic database and identify those individual data elements containing properties or relationships indicative of particular expertise. The corpus containing labeled individual data elements may then be divided into a learning set and test set. The learning set may be used as input to the classifier modeling function 637 for developing the classification model (or classifier model) 638.

Specifically, these labeled individual data elements may be related to other data elements of various dimension in the graph database of industrial graph knowledgebase. Correlations between these individual data elements and other data elements may be identified as features by the classifier modeling function 637 using any selected machine learning algorithm for developing the classifier model 638. The machine learning algorithms, for example, may be provided by the data analysis and modeling component library 310. The classifier model 638, represented by, e.g., a set of classifier model parameters, may be tested by calculating features and classifier model parameters for the data elements in the test set of the corpus, classifying these individuals using the classifier model, and comparing the calculated classifications to the existing labels. The classifier model parameters and thus the classifier model 638 may be refined by recursively running the classifier modeling function 637 for achieving better classification accuracy of the test set of the corpus.

Once the classifier model 638 reaches a predetermined accuracy level, it may then be used to classify other unlabeled individual data elements by calculating features of those unlabeled individuals based on the information contained in the industrial graph knowledgebase and the corresponding graph database. The classified individual data elements may then be grouped according to the classification to form the graph elements of the first layer 700 of the multilayer collaboration graph 312. Because an individual may possess multiple expertise corresponding to the role groups 702, 704, and 706, the same individual may appear in two or more of the role groups. For example, process expert 1 of role group 702 may be the same individual as the data expert 2 of role group 706.

The collaborative modeling process 311 of FIG. 6 may further be used to extract information from the industrial graph knowledgebase 120 and the predefined data processing module identifiers 304 to form the second layer 720 of the multilayer collaboration graph 312. For example, process graph elements of the industrial process sublayer 722 of FIG. 7 may be directly extracted from the industrial process knowledgebase 604 of the graph database of FIG. 6. Similarly, the graph elements in data process sublayer 724 of FIG. 7 may be directly extracted from the predefined data processing module identifiers 304, as shown by 650 of FIG. 6.

In one implementation, the data process sublayer 724 may not include all predefined data processing module identifiers 304. Rather it may only include the identifiers representing data processing modules that are data centric and need at least floor expert or data expert to perform. For example, among the data modules illustrated in the flow matrix 551 of FIG. 5, only data processing modules related to data cleaning and data modeling (such as a high dimension reduction module, a random forest regression module, and the like) may be included as graph elements in the data process sublayer 724. Data processing module related to data preparation, importing, and requirement extraction, as shown in the "Requirement Extraction", "Data Preparation", and "Application Development" columns of the flow matrix 551 may not be included as graph elements in the data process sublayer 724. As such, data process sublayer 724 may be alternatively referred to as a data science sublayer due to its requirement on knowledge of data science.

The collaborative modeling process 311 of FIG. 6 may further be used to extract information from the data modeling stage dimension (504 of FIG. 5) of the predefined two-dimensional industrial data modeling template 302, as shown by 650 of FIG. 6, to form the third layer 740 of the multilayer collaboration graph 312 in FIG. 7.

The directional arrows or relationships 750 and 760 of the multilayer collaboration graph 312 in FIG. 7 may be further established by the collaborative modeling process 311 of FIG. 6. These relationships may be binary in that a relationship between two graph elements is either in existence or not. Alternatively and preferably, these relationships may each be quantified by a degree of relationship value, as shown by the numbers associated with the arrows in FIG. 7. These relationships between graph elements across various layers of the multilayer collaboration graph of FIG. 7 may be established based on empirical information. For example, a particular set of individuals from the first layer 700 may be known to possess expertise of known degrees of a particular industrial process among the industrial processes in sublayer 722 or a particular data processing module among the data processing modules in sublayer 724.

Alternatively and additionally, the relationships between the graph elements in the first layer 700 and the graph elements in the industrial process sublayer 722 of the multilayer collaboration graph 312 of FIG. 7 may be extracted and quantified based on information contained in the industrial graph knowledgebase 120 of FIG. 6. Specifically, the industrial graph knowledgebase contains data elements for individuals in its workforce dimension and their relationships with other data elements either within the workforce dimension or across dimensions, forming a graphic network. The degree of connection of a particular individual data element in the workforce dimension to, e.g., a particular industrial domain process data element may be measured based on various connecting paths in the network of data elements in the industrial graph knowledgebase. As such, the connections between graph elements in the first layer 700 and the graph elements in industrial process sublayer 722 of the multilayer collaboration graph 312 of FIG. 7 (as indicated by some of the arrows 750) may be identified and quantified via the entity and relation extraction function 632, link-based prediction function 634, multi-relational modeling function 636, and other functions of the collaborative modeling process 311 of FIG. 6, based on the industrial graph knowledgebase 120.

In one implementation, the quantification of inter-layer relationships such as those represented by arrows 750 may be established using a graphical model for the multilayer collaboration graph 312. The graphical model may be based on a Bayesian network construction, representing dependencies between random variables in a probabilistic model. The analysis components need for the probability model may be provided by the data analysis and modeling component library 310 in FIG. 3.

In one implementation, the graph elements of the data process sublayer 724 of the multilayer collaboration graph 312 in FIG. 7 may have already been included as part of the industrial graph knowledgebase 120 of FIG. 6. The extraction and quantification of relationships between the graph elements in the first layer 700 and the graph elements in the data processing sublayer 724 of the multilayer collaboration graph 312 may be determined by the collaborative modeling process 311 of FIG. 6 in a similar way to the extraction and quantification of relationships between the graph elements in the first layer 700 and the graph elements in the industrial process sublayer 722 of the multilayer collaboration graph 312.

In another implementation, the industrial graph knowledgebase 120 may not include direct data elements of data processing modules corresponding to the graph elements in the data process sublayer 724 of the multilayer collaboration graph 312. In such a situation, a classifier based on machine learning algorithms may be used to classify the graph elements in the first layer 700 into classes defined by the graph elements in the data processing sublayer 724 of the multilayer collaboration graph 312 of FIG. 7. Specifically, a corpus may be first established by labeling a subset of graph elements in the first layer 700 with data processing modules (classes). Then information contained in the graph network of the industrial graph knowledgebase 120 may be used to develop features and a classifier model for classifying the unlabeled graph elements in the first layer 700 into various classes of various data processing modules. The classifier model is preferably non-binary. As such, the classification of the graph elements in the first layer into the data processing modules may be associated with a weight values. Such weight values may be used to characterize the degrees of connections discussed above and shown by the numbers associated with the arrows 750. In one implementation, graphical and probability models discussed above may be used to quantify the relationships between the graph elements of the first layer 700 and the graph elements of the data process sublayer 724.

In the multilayer collaboration graph 312 of FIG. 7, the third layer 740 includes the data modeling stage graph elements extracted from the column dimension of the predefined two-dimensional industrial data modeling template 302 by the collaborative modeling process 311 as shown in FIG. 6. For example, the graph elements in the third layer 740 may include requirement extraction graph element 742, data preparation graph element 744, data cleaning graph element 746, data modeling graph element 748, and application development graph element 749. In one implementation, the relationship between graph elements in the second layer 720 and the third layer 740 of the multilayer collaboration graph 312 of FIG. 7 may be predetermined. For example, requirement extraction, data preparation, data cleaning and application development may need input related to industrial domain processes but do not need input related to the data processing modules. As such, graph elements 742, 744, 746, and 749 of the third layer 740 may be related to the industrial process sublayer 722 as shown in FIG. 7. Such relationships may be at a level between individual graph elements in the third layer 740 and the industrial process sublayer 722 as a whole. Which individual processes within the industrial process sublayer 722 may be involved in a particular data modeling request may be determined via the requirement extraction interface 342 in FIG. 3.

For another example, only data cleaning and data modeling of layer 740 of FIG. 7 may be related to various data processing module graph elements in the data process sublayer 724 of the second layer 720 of FIG. 7. These relationships, may be predetermined and specified between graph elements in the third layer 740 and individual graph elements in sublayer 724 independent of particular data modeling tasks, as shown by some of the arrows 760 in FIG. 7. For example, data modules in sublayer 724 for data filtering and noise reduction may be related to the data cleaning graph element 746 of layer 740. Whether a particular data processing module of sublayer 724 of the second layer 720 with predetermined relationship to a graph element in the third layer 740 is need for a particular data modeling task may be determined during the requirement extraction process in FIG. 3.

In one implementation, the relationships represented by arrows 760 between second layer 720 and the third layer 740 in FIG. 7 may be binary, i.e., the relationships either is or is not in existence. As such, the arrows 760 between the second layer 720 and the third layer 740 of the multilayer collaboration graph 312 in FIG. 7 may not be associated with any values for measuring the relationships.

Returning to FIG. 3, the multilayer collaboration graph 312, the data modeling requirements 326, and the flow matrix 308 discussed above may be input into the flow controller 330. The flow controller 330 is responsible for determining the required data processing modules and relevant domain processes for a particular requested data modeling task from the data modeling requirements 326, and in conjunction with the multilayer collaboration graph 312, identify a group of individual experts that may collaboratively participate in various flow stages of the data model and application development. The flow controller 330 is further responsible for automatically provisioning the data modeling request from individual to individual among the identified collaborative group via the user interface 360.

Figure 8:
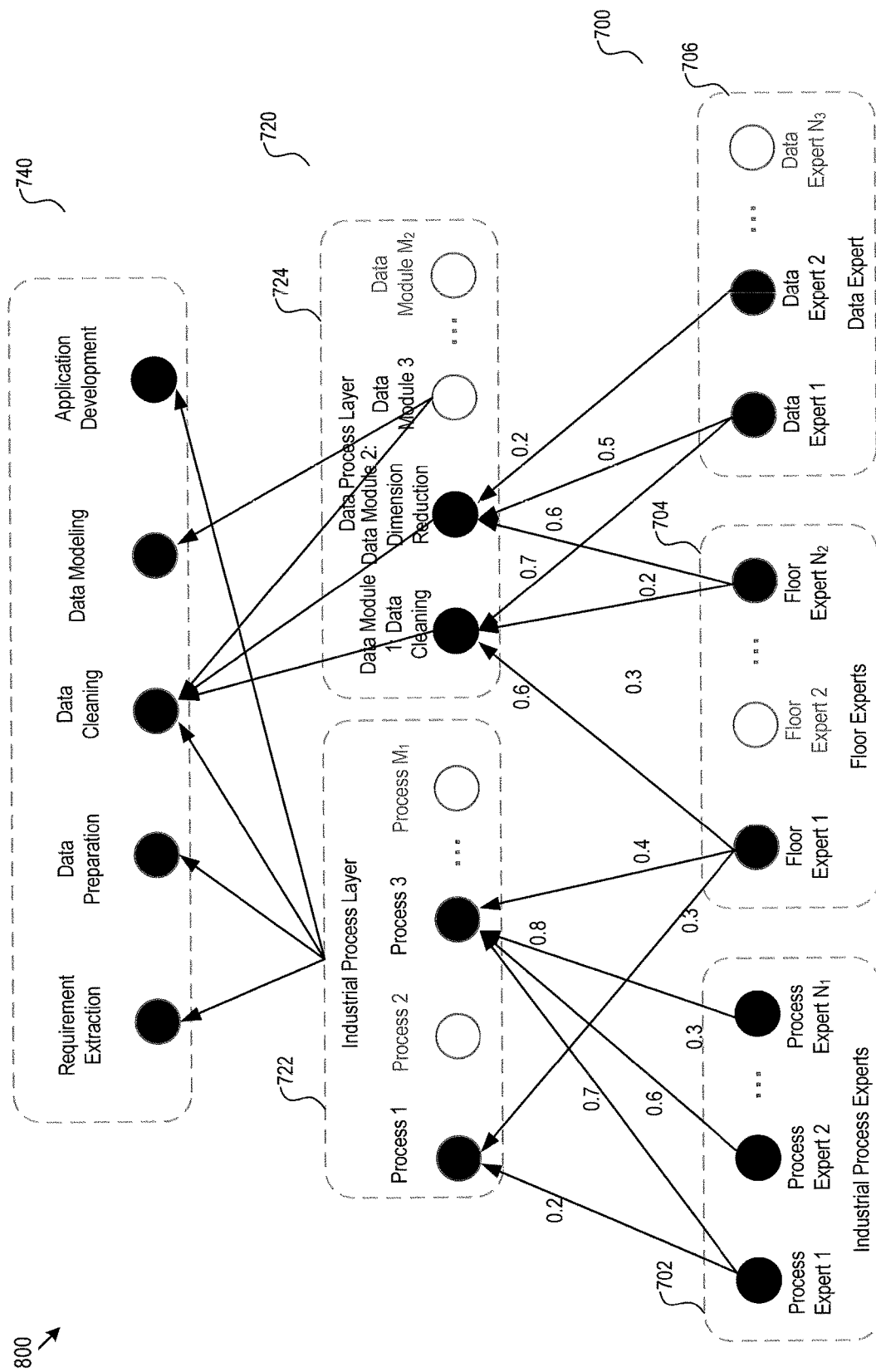
FIG. 8 illustrates a multilayer collaboration graph applied to a particular data modeling request.

In one implementation, the flow controller 330 may first determine the relevant graph elements in the second layer 720 of the multilayer collaboration graph 312 of FIG. 7 and simplify/redact the multilayer collaboration graph 312. FIG. 8 shows an exemplary simplified/redacted multilayer collaboration graph 800 for a particular data modeling task. Specifically, the industrial processes and data modules that are grayed out in the second layer of FIG. 8 are not part of the data modeling requirements 326 whereas the darkened industrial processes and data modules are among the data modeling requirements 326 for the particular data modeling task. As such, the grayed graph elements in the second layer and the any arrows (relationships) connected to and originated from these grayed graph elements may be removed. Further, any graph elements in the first layer that are not related to at least one darkened graph elements in the second layer 720 and arrows originated from them may be removed, such as floor expert 2, and data expert $N_3$.

The flow controller 330 may then determine the group of collaborative experts for the data modeling request based on the simplified/redacted multilayer collaboration graph 800 of FIG. 8. In the example of FIG. 8, the data modeling request is determined to relate to industrial processes 1 and 3. According to the example flow matrix 551 of FIG. 5, a process expert is needed for performing "business requirement" analysis. Such analysis may not be part of the data process or data science sublayer 724. According to the simplified/redacted multilayer collaboration graph 800, the flow controller 330 thus proceeds to identify process expert 1 to perform the "business requirement" analysis with respect to process 1 (process expert 1 is the expert within the process expert group 702 who is qualified according to the quantified relationships in FIG. 8). The flow controller 330 further identifies process experts Ni as the best qualified within the process expert group 702 to handle the "business requirement" analysis with respect to process 3. In one alternative implementation, the flow controller 330 may take into consideration an absolute or a relative difference in qualification as to process 3 between process expert 1 and process expert Ni (0.7 versus 0.8 in this example) and may select expert 1 rather than expert Ni to handle the "business requirement" analysis with respect to process 3, after weighing the difference in qualification against the advantage of having a single expert perform "business requirement" analysis with respect to both process 1 and process 3.

The flow controller 330 further determines according to the example flow matrix 551 of FIG. 5 that one or more floor experts are needed to analyze "data availability", to perform "data import" and "data quality analysis". Again, these data processing modules may not be part of the data science sublayer 724. As such and based on the example in FIG. 8, the flow controller 330 may select floor expert 1 to perform all these analyses because floor expert 1 is the only one in the floor expert group that are qualified with respect to process 1 and process 3. If other floor experts are related to process 1 and/or process 3, selection may be made in a similar way as to the selection between process expert 1 and process expert Ni above.

The flow controller 330 then determines according to the example flow matrix 551 of FIG. 5 that a data expert is needed to perform "data cleaning". The flow controller 330 may identify that data expert 1 is the only expert with the data expert group 706 who is related to data model 1 (data cleaning) in the data science sublayer 724. The flow controller 330 further determines that "dimension reduction" needs to be performed by a data expert. It may identify that both data expert 1 and data expert 2 are knowledgeable about dimension reduction and data expert 1 is more qualified. In this case, the flow controller 330 may select data expert 1 to perform the dimension reduction because data expert 1 is more qualified (higher quantified relationship with data module 2) and because it is advantageous to have a single expert (data expert 1) to perform both data module 1 (data cleaning) and data module 2 (dimension reduction).

Finally, the flow controller 330 determines that a process expert is need to complete building an application based on the data model. Application development may not involve data expert and thus the process expert may be selected in a similar way as above when the process expert for analyzing "business requirement" is selected.

It is assumed in the exemplary selection process above by the flow controller 330 that each data module in the example flow matrix 551 of FIG. 5 is to be performed by one expert. In some implementation, the flow controller 330 may specify a number of experts needed to perform each data module. The selection of experts may then be performed based on combined qualification of experts. Further, calendars of the experts may be maintained and used as constraints in the expert selection process by the flow controller 330. The flow controller 330 further automatically and sequentially controls the data modeling process to the selected experts in a sequence based on the example flow matrix 551. Once the requested data model and application are developed via this process, the data model or application may then be used to control the industrial operation. For example, as illustrated in the data model of PCT International Patent Application No. PCT/CN2016/096386 filed on Aug. 23, 2016 with the China State Intellectual Property Office by the same applicant, operation parameter of the industrial plant may be controlled based on the data model for optimizing production of a particular product. Specifically, in a complex chemical plant, a predictive model may be developed using the flow control above involving various process experts, data experts, and flow experts, by analyzing historical production and sensor data using various data processing components and machine learning algorithms to provide accurate real-time prediction of production rates of chemical products. Optimal operation parameters such as temperatures, pressures, and chemical mixture proportions for maximizing the production of the chemical products may be determined from the predictive model. A feedback mechanism may be employed to control the various active elements in the chemical plant such as heaters and chemical dischargers such that these parameters are controlled within predetermined ranges around the optimal values as measured by various sensors in the chemical plant.

The methods, devices, processing, and logic described above may be implemented in many different ways and in many different combinations of hardware and software. For example, all or parts of the implementations may be circuitry that includes an instruction processor, such as a Central Processing Unit (CPU), microcontroller, or a microprocessor; an Application Specific Integrated Circuit (ASIC), Programmable Logic Device (PLD), or Field Programmable Gate Array (FPGA); or circuitry that includes discrete logic or other circuit components, including analog circuit components, digital circuit components or both; or any combination thereof. The circuitry may include discrete interconnected hardware components and/or may be combined on a single integrated circuit die, distributed among multiple integrated circuit dies, or implemented in a Multiple Chip Module (MCM) of multiple integrated circuit dies in a common package, as examples.

The circuitry may further include or access instructions for execution by the circuitry. The instructions may be stored in a tangible storage medium that is other than a transitory signal, such as a flash memory, a Random Access Memory (RAM), a Read Only Memory (ROM), an Erasable Programmable Read Only Memory (EPROM); or on a magnetic or optical disc, such as a Compact Disc Read Only Memory (CDROM), Hard Disk Drive (HDD), or other magnetic or optical disk; or in or on another machine-readable medium. A product, such as a computer program product, may include a storage medium and instructions stored in or on the medium, and the instructions when executed by the circuitry in a device may cause the device to implement any of the processing described above or illustrated in the drawings.

The implementations may be distributed as circuitry among multiple system components, such as among multiple processors and memories, optionally including multiple distributed processing systems. Parameters, databases, and other data structures may be separately stored and managed, may be incorporated into a single memory or database, may be logically and physically organized in many different ways, and may be implemented in many different ways, including as data structures such as linked lists, hash tables, arrays, records, objects, or implicit storage mechanisms. Programs may be parts (e.g., subroutines) of a single program, separate programs, distributed across several memories and processors, or implemented in many different ways, such as in a library, such as a shared library (e.g., a Dynamic Link Library (DLL)). The DLL, for example, may store instructions that perform any of the processing described above or illustrated in the drawings, when executed by the circuitry.

Various implementations have been specifically described. However, many other implementations are also possible.

What is claimed is:

1. A system, comprising:
   a graph knowledgebase containing data elements linked to an industrial operation and relationships between the data elements;
   a log for operational data of the industrial operation;
   a memory for storing:
     a predefined data modeling template comprising a data modeling stage dimension and a resource dimension representing predefined data modeling stages and predefined types of resources for data modeling tasks; and
     a resource allocation graph structure having graph elements organized into a resource layer, a process layer, and a data modeling stage layer, where the graph elements in the data modeling stage layer correspond to the predefined data modeling stages; and
   system circuitry configured to:
     extract, from the graph knowledgebase, resource data elements classified into the predefined types of resources to obtain the graph elements for the resource layer of the resource allocation graph structure;
     extract industrial process data elements from the graph knowledgebase to obtain the graph elements for the process layer of the resource allocation graph structure;
     obtain, based on the graph knowledgebase, relationships between the graph elements in the resource layer and the process layer and between the graph elements in the process layer and the data modeling stage layer of the resource allocation graph structure;

upon receiving a request for a data modeling task:
determine a set of industrial processes associated with the data modeling task;
select a group of resource graph elements from the resource allocation graph structure based on the set of industrial processes and the relationships between the graph elements in the resource layer and the process layer; and
automatically allocate the data modeling task to the selected group of resource graph elements for modeling the operational data from the log at each of the predefined data modeling stages to obtain a data model according to the resource allocation graph structure; and
control the industrial operation based on the data model.

2. The system of claim 1, where the graph elements of the resource layer comprise allocable human resource graph elements.

3. The system of claim 2, where the allocable human resource graph elements of the resource layer are grouped into multiple predefined types of human resource graph elements and the group of graph elements selected form the resource layer comprise at least one graph element from each of the multiple predefined types of human resource graph elements.

4. The system of claim 3, where the allocable human resource graph elements, when being extracted from the graph knowledgebase, are classified into the multiple predefined types of human resource graph elements using a classifier established from the graph knowledgebase based on a machine learning algorithm.

5. The system claim 3, where the multiple predefined types of human resource graph elements comprise types of expertise associated with data modeling of industrial operational data.

6. The system of claim 3, where the system circuitry is further configured to select, among a predefined collection of data modeling tasks, the data modeling task according to the data modeling request.

7. The system of claim 6, the memory further comprising a data modeling flow data structure comprising a data modeling stage dimension and a resource dimension representing the predefined set of data modeling stages and the multiple predefined types of human resource graph elements, and where the data modeling flow data structure further specifies association between pairs of the predefined set of data modeling stages and the predefined types of human resource graph elements, and the data modeling task.

8. The system of claim 7, where the system circuitry is configured to automatically allocate the data modeling request further according to the data modeling flow data structure.

9. The system of claim 1, where inter-layer relationships between the graph elements are quantified based on the data elements and relationships in the graph knowledgebase and system circuitry is configured to automatically allocate the data modeling request further based on the quantified inter-layer relationships.

10. A method, comprising:
extracting, from a graph knowledgebase containing data elements linked to an industrial operation and relationships between the data elements, resource data elements classified into predefined types of resources to obtain graph elements for a resource layer of a resource allocation graph structure;
extracting industrial process data elements from the graph knowledgebase to obtain the graph elements for a process layer of the resource allocation graph structure;
obtaining, based on the graph knowledgebase, relationships between the graph elements in the resource layer and the process layer and between the graph elements in the process layer and a data modeling stage layer of the resource allocation graph structure;
in response to receiving a request for a data modeling task:
determining a set of industrial processes associated with the data modeling task;
selecting a group of resource graph elements from the resource allocation graph structure based on the set of industrial processes and the relationships between the graph elements in the resource layer and the process layer; and
automatically allocating the data modeling task to the selected group of resource graph elements for modeling the operational data from a log for operational data of the industrial operation at each of a set of predefined data modeling stages to obtain a data model according to the resource allocation graph structure; and
controlling the industrial operation based on the data model.

11. The method of claim 10, where the graph elements of the resource layer comprise allocable human resource graph elements.

12. The method of claim 11, where the allocable human resource graph elements of the resource layer are grouped into multiple predefined types of human resource graph elements and the group of graph elements selected form the resource layer comprise at least one graph element from each of the multiple predefined types of human resource graph elements.

13. The method of claim 12, where the allocable human resource graph elements, when being extracted from the graph knowledgebase, are classified into the multiple predefined types of human resource graph elements using a classifier established from the graph knowledgebase based on a machine learning algorithm.

14. The method claim 12, where the multiple predefined types of human resource graph elements comprise types of expertise associated with data modeling of industrial operational data.

15. The method of claim 12, further comprising selecting, among a predefined collection of data modeling tasks, the data modeling task according to the data modeling request.

16. The method of claim 15, further comprising maintaining a data modeling flow data structure including a data modeling stage dimension and a resource dimension representing the predefined set of data modeling stages and the multiple predefined types of human resource graph elements, and automatically allocating the data modeling request according to the data modeling flow data structure, where the data modeling flow data structure further specifies association between pairs of the predefined set of data modeling stages and the predefined types of human resource graph elements, and the data modeling task.

17. The method of claim 10, where inter-layer relationships between the graph elements are quantified based on the data elements and relationships in the graph knowledgebase, the method further comprising automatically allocate the data modeling request based on the quantified inter-layer relationships.

\* \* \* \* \*